S. GARFIELD.
POTATO SEPARATOR.
APPLICATION FILED DEC. 26, 1913.
1,123,514.
Patented Jan. 5, 1915.
3 SHEETS—SHEET 1.
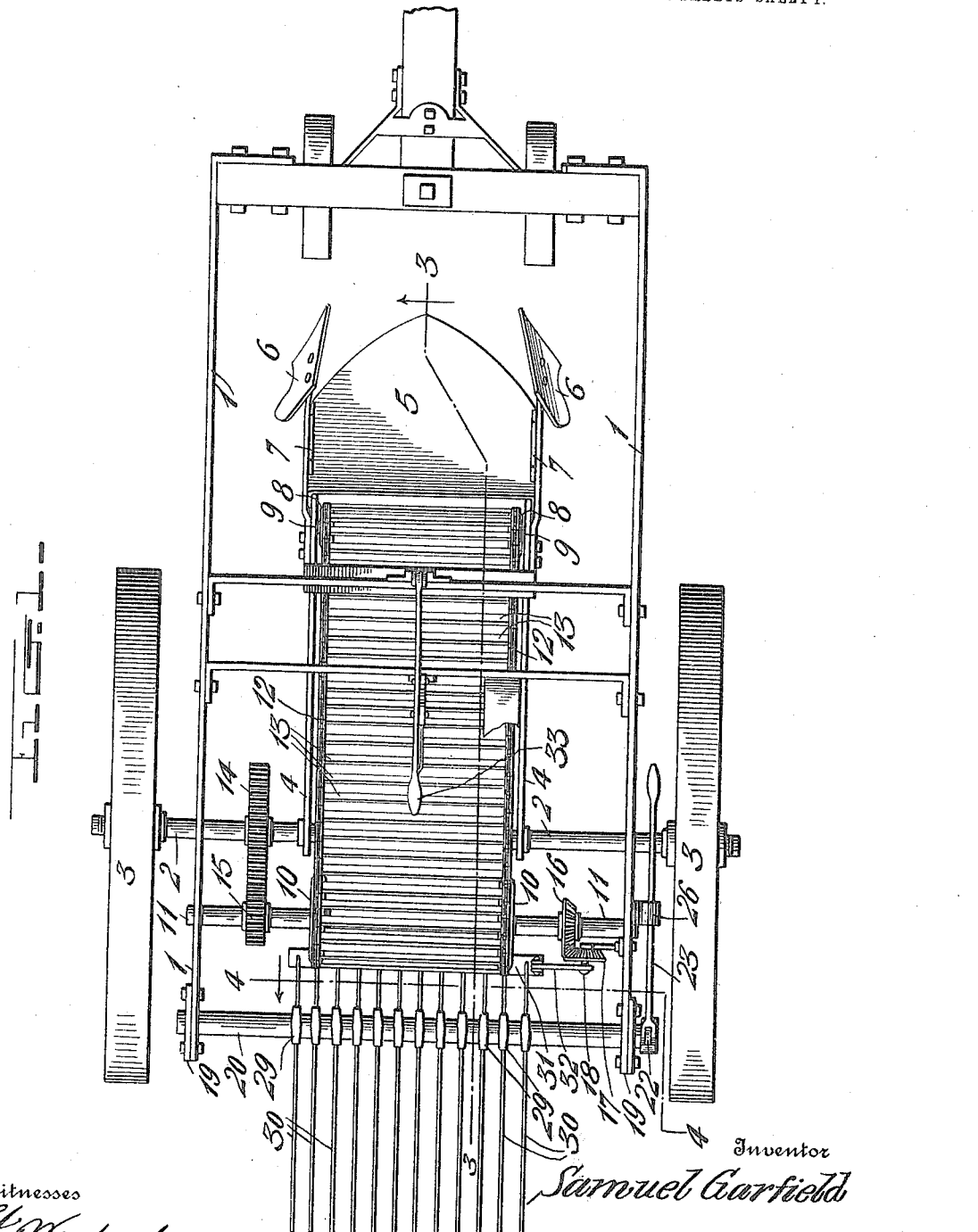
Witnesses
H. Woodard
J. R. Pierce
Inventor
Samuel Garfield
By H. B. Willson & Co.
Attorneys

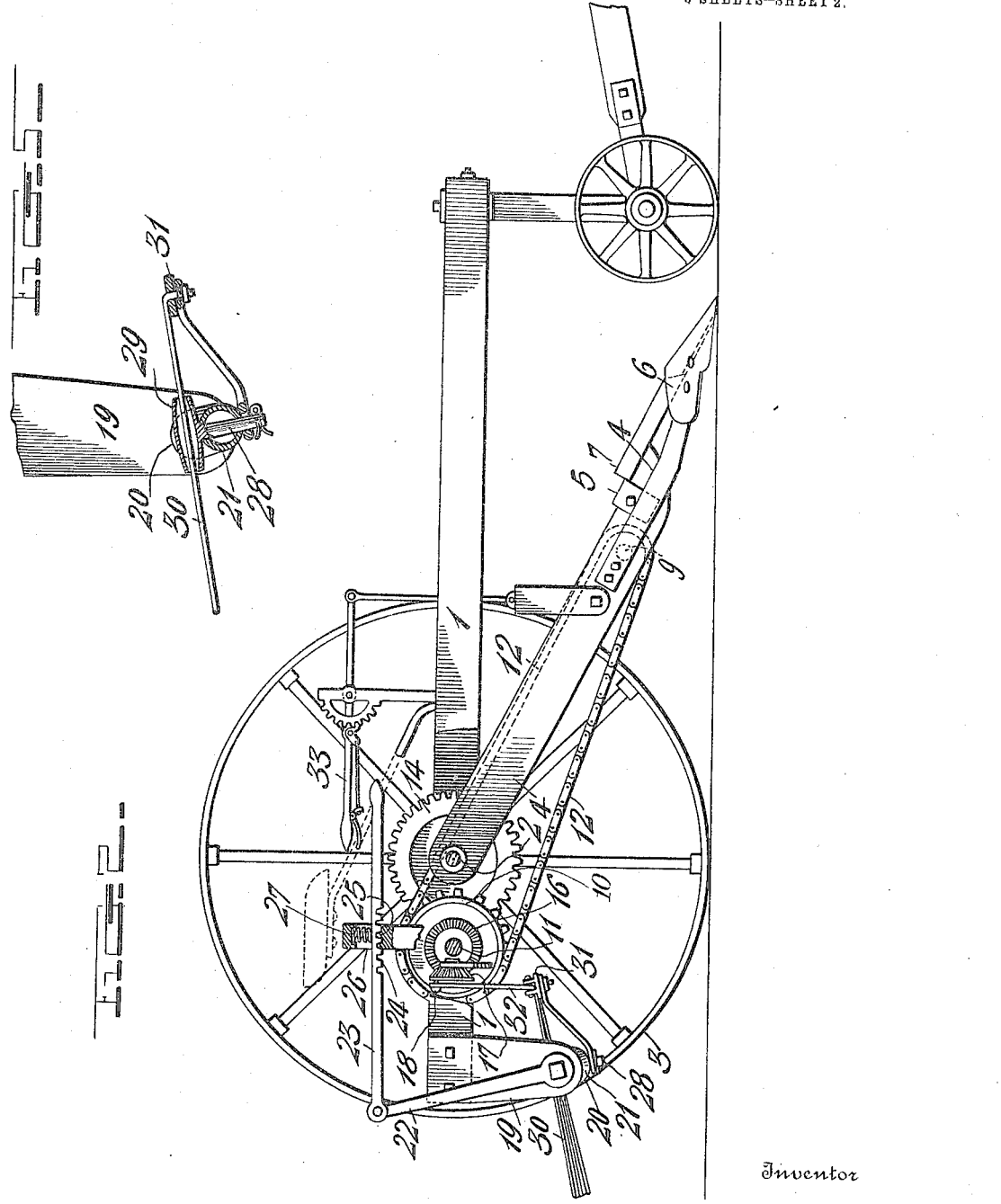

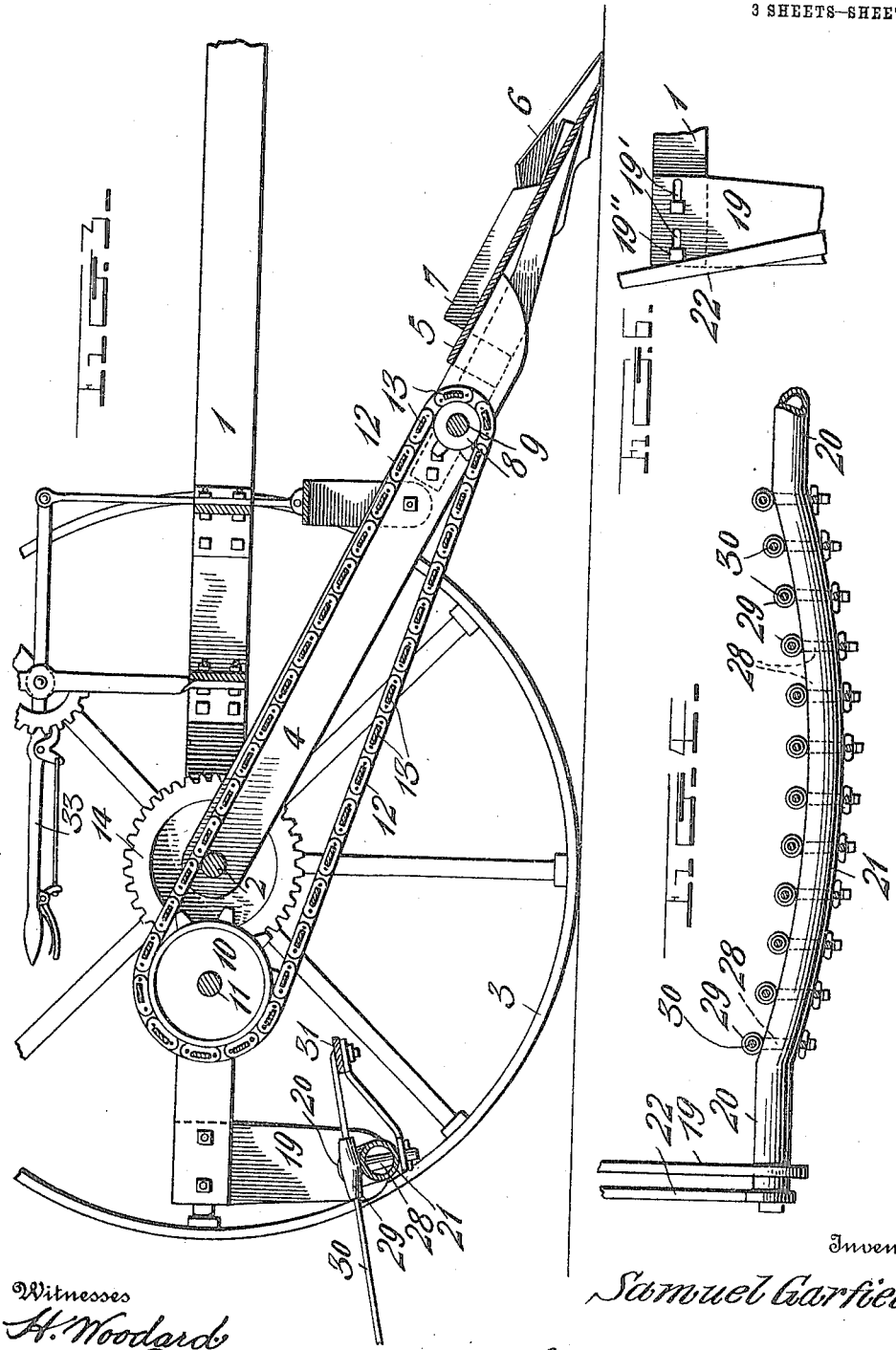

ary object is to so construct the
UNITED STATES PATENT OFFICE.

SAMUEL GARFIELD, OF FARMINGTON TOWNSHIP, WARREN COUNTY, PENNSYLVANIA.

POTATO-SEPARATOR.

1,123,514.    Specification of Letters Patent.    Patented Jan. 5, 1915.

Application filed December 26, 1913. Serial No. 808,825.

*To all whom it may concern:*

Be it known that I, SAMUEL GARFIELD, a citizen of the United States, residing at Farmington township, in the county of Warren and State of Pennsylvania, have invented certain new and useful Improvements in Potato-Separators; and I do declare the following to be a full, clear, and exact description of the invention, such as will enable others skilled in the art to which it appertains to make and use the same.

This invention relates to improvements in potato digging machines comprising elevating mechanisms and the primary object of the invention is to provide an improved receiving and shaking device onto which the potatoes are dropped for the purpose of removing any soil which may have clung to them.

A secondary object is to so construct the above mentioned device as to render it adjustable to a greater or less inclination.

Still another object is to construct the support for the receiver and shaker in such a manner that the potatoes will be discharged from the rear end thereof over a comparatively small area, thus facilitating the work of the farmhands who follow the machine and pick up the potatoes dug by said machine.

With the above objects in view, the invention resides in certain novel features of construction and combination herein described and claimed and shown in the accompanying drawings wherein:

Figure 1 is a plan view of my improved potato digger; Fig. 2 is a side elevation thereof, parts being broken away and in section; Fig. 3 is a longitudinal sectional view on the line 3—3 of Fig. 1; Fig. 4 is a cross section on the line 4—4 of Fig. 1; Fig. 5 is a detail vertical section showing the manner in which the shaking rods are pivoted to the rock shaft; and Fig. 6 is a detail side elevation of a portion of the machine showing a slightly modified detail of construction.

In the embodiment illustrated in the drawings, I have shown my improved potato digger as comprising a main frame 1 supported by an axle 2 carrying rigid wheels 3 on its opposite ends. Pivotally mounted near the center of the axle 2 are downwardly inclined bars 4 which are connected to the opposite sides of a shovel plow 5, independent mold boards 6 being employed on each side of said shovel plow. The shovel plow 5 is preferably provided with upstanding flanges 7 along its opposite edges for a purpose to appear. Passing around sprocket wheels 8 carried by a shaft 9 at the forward end of the bars 4 and other sprocket wheels 10 carried by a shaft 11 journaled in bearings on the frame 1, are endless chains 12 which are connected by slats 13 to constitute a conveyer for receiving the potatoes from the shovel plow 5, the flanges 7 on said plow preventing the potatoes from rolling off the sides thereof. The shaft 11 is driven by means of a master gear 14 carried on the axle 2, said master gear meshing with a pinion 15 on said shaft 11. The shaft 11 carries, near one end, a bevel gear 16 which meshes with a bevel gear 17 supported by a bracket depending from the frame 1 and said bevel gear 17 carries a wrist pin 18 for a purpose to appear.

Journaled in brackets 19 depending from the rear end of the frame 1, is a rock shaft 20 having its central portion bowed downwardly as at 21. One end of this rock shaft carries a lever 22 to the upper end of which is pivoted an operating link 23 which projects forwardly within convenient reach of the driver's seat. The link 23 is provided on its lower edge with a plurality of rack teeth 24 said teeth being adapted to engage a single tooth 25 carried by a standard 26 on the frame 1 said link 23 being held downwardly by means of a coil spring 27.

Journaled at suitable intervals through the rock shaft 20 are substantially upright pivot studs 28 which carry lateral guide sleeves 29 on their upper ends. A plurality of rods 30 are mounted to slide within the sleeves 29, said rods being maintained in parallel relation by means of a connecting and spacing link 31 pivoted to their inner ends. This link 31 is connected by a pitman rod 32 with the wrist pin 18 on the bevel gear 17. By the above described construction, when the entire machine is propelled forwardly over the soil and the shovel 5 is lowered by means of a lever 33, the potatoes will be raised from the ground by said shovel, conveyed upwardly upon the slats 13 and discharged upon the rods 30, said rods then having an oscillating movement due to the rotation of the bevel gear 17 by the driving means between said gear and the main axle.

The brackets 19 may be supported rigidly by the frame 1 as shown in Figs. 1 to 5 or they may be provided with slots 19' at their upper ends through which bolts 19'' pass and thus adjustably secure said brackets to the frame 1. By this detail of construction, the rock shaft 20 and the sleeves 29 carried thereby may be shifted forwardly or rearwardly to impart a greater movement to the front ends of the bars 30 than that imparted to the rear ends thereof or vice versa. Imparting a greater movement to the front ends of said bars the potatoes are violently shaken when they are discharged upon said ends but as they work toward the rear ends of the bars and most of the earth is removed from them this movement is diminished thus preventing the potatoes from being discharged to the sides of the machine and allowing them to fall in a comparatively narrow row across the field.

The rock shaft 20 is obviously bowed downwardly at its center for the purpose of more readily retaining the potatoes on the rods 30 and said rock shaft may be rotated to adjust said rods to a greater or less inclination. This also is a very important feature of my invention since, when digging in light soil less shaking of the potatoes is required than when digging in heavy soil and as above stated, I may vary the angle of the rods 30 so as to allow the potatoes to pass more or less quickly therefrom.

Although I have described a potato digger of one construction to which my improved receiving and shaking device may be applied, it will be clearly understood that it will operate to equal advantage with any type of machine having digging and elevating means for the potatoes. It will also be understood that although I have described details of construction with more or less minuteness, I do not wish to be limited thereto otherwise than as specified in the appended claims.

Having thus described my invention, what I claim as new is:

1. The combination with a frame means for elevating the potatoes above the ground, of a downwardly bowed rock shaft journaled on said frame, guides having pivotal mountings on said rock shaft, rods slidable within said guides, a spacing and connecting link pivoted to said rods, means for oscillating said rods and their guides and means for rocking said shaft and the guides and rods carried thereby.

2. The combination with a frame means for elevating the potatoes above the ground, of a downwardly bowed rock shaft journaled on said frame, upright stub shafts journaled through said rock shaft, lateral sleeves on said stub shafts, rods loosely mounted in said sleeves, a connecting and spacing link pivoted to said rods, means for oscillating said rods and means for rocking said rock shaft.

In testimony whereof I have hereunto set my hand in presence of two subscribing witnesses.

SAMUEL GARFIELD.

Witnesses:
JOSEPH A. SCHOFIELD.
GEORGE F. HENRY.

Copies of this patent may be obtained for five cents each, by addressing the "Commissioner of Patents, Washington, D. C."